July 26, 1960 L. H. STEINMAN ET AL 2,946,900

REDUNDANT TRANSISTOR FLIP-FLOPS

Filed Nov. 20, 1957 2 Sheets-Sheet 1

INVENTORS:
Leon Steinman
Merritt L. MacKnight

By Seymour Scholnick
Attorney

INVENTORS:
Leon Steinman
Merritt L. MacKnight

By Seymour Schalnick
Attorney

United States Patent Office 2,946,900

Patented July 26, 1960

2,946,900

REDUNDANT TRANSISTOR FLIP-FLOPS

Leon H. Steinman, Los Angeles, and Merritt L. MacKnight, Manhattan Beach, Calif., assignors to Litton Industries of California, Beverly Hills, Calif.

Filed Nov. 20, 1957, Ser. No. 697,728

16 Claims. (Cl. 307—88.5)

The present invention relates to a redundantly constructed flip-flop circuit and more particularly to a flip-flop including redundant quad amplifier circuits for substantially increasing the reliability of the flip-flop.

Electronic digital computing or switching machines as they are commonly constructed, comprise large numbers of flip-flop circuits ordinarily connected together in such manner that the failure of any individual flip-flop is sufficient to destroy the operation of the total machine. Assuming, for purposes of example, identical probabilities of failure for each of the flip-flops in a machine and that there are $n$ such flip-flops in the total machine, then it may be said that the probability of failure of the total machine is approximately $n$ times greater than the probability of failure of an individual flip-flop. Thus, for example, if there is a statistical expectation that a flip-flop will fail in 3,000 hours and there are 100 flip-flops in the machine, then it may be expected that the machine as a whole will fail at least once in 30 hours. When one realizes that machines are now being projected which utilize as many as 1,000 or more flip-flops, it can be seen that a very real reliability crisis is developing. This is especially true in certain applications where the penalty for failure is great, as for example, in industrial control work.

It is therefore extremely important that the reliability of flip-flop circuits be greatly increased. Basically, a flip-flop circuit is a device having two internal states and selectively responsive to applied input signals for switching to either state, the device being operable for producing a bi-valued output signal having one value when the circuit is in one of its internal states and a second value when the flip-flop circuit is in the other of its internal states.

The most common and widely used flip-flop circuit is of the Eccles-Jordan type in which two amplifiers are intercoupled so that only one of the amplifiers can be conducting, the conduction states of the two amplifiers being reversed upon application of a signal to an appropriate amplifier input. A high or low level voltage output signal is derived from an appropriate point on one of the amplifiers.

One method whereby greater reliability can be achieved is disclosed in copending U.S. patent application, Serial No. 602,207, for "Voted-Output Flip-Flop Unit," filed on August 6, 1956, by Floyd G. Steele. In the voted flip-flop unit there is substituted for each flip-flop circuit in a machine, a flip-flop unit which comprises three independently operating flip-flop circuits, input signals being applied to corresponding input terminals of the three flip-flops so that if all of the flip-flops are working properly their output signals will be identical. A so called "voting circuit," receives the output signals from each of the flip-flop circuits and combines these signals to produce a bi-valued resultant volted output signal whose value is determined by agreement between any two of the three flip-flop circuits.

The voted flip-flop unit produces a substantial improvement in reliability of sufficient magnitude that it can be utilized with success in most applications requiring a highly reliable flip-flop unit. However, in a few applications where the penalty for failure is extreme an even more reliable flip-flop circuit than the voted flip-flop unit is needed.

When it is realized that most flip-flop circuit failures appear to be caused by the failure of the flip-flop circuit active elements (i.e. vacuum tubes in a tube flip-flop, or transistors in a transistorized flip-flop) then it is clear that if the reliability of these elements were improved the reliability of the flip-flop circuit would be substantially increased. However, it appears to be impossible at the present time, at least, to substantially increase the reliability of the individual vacuum tube or transistor elements and, therefore, a great need exists for a practical method to increase the reliability of flip-flop circuits by some other means.

Recently, satisfaction of this need has been attempted by the use of redundant components, that is by replacing a component with poor reliability by a unit of two or more of the same components intercoupled so that in operation they are made to do the work of one in such a manner that if one of the components contained within the unit fails, the operation of the unit is unaffected.

C. J. Creveling discusses the use of "twin" units to increase the reliability of a dynamic type of flip-flop circuit on page 509 of the April issue of the Proceedings of the Institute of Radio Engineers in an article entitled "Increasing the Reliability of Electronic Equipment by the Use of Redundant Circuits." The dynamic type of flip-flop is a type of feedback oscillator which performs all logical operations by means of a passive gating circuit, an active amplifier element being interposed only as a pure amplifier to compensate for the attenuation of these passive logic circuits. The logic circuits being entirely passive (i.e.—diodes, resistors, capacitors, etc.), it is presumed by Creveling that their reliability will be good compared to that of the active elements. The active elements (tubes, transistors, etc.) then are replaced by a "twin" unit. The "twin" consists of two active elements connected in parallel with each other and in series with buffer resistors. If one of the elements fails by opening, the remaining operable element will still operate while if one of the elements fails by shorting the buffer resistors will prevent the short circuiting of the remaining element so that again it still operates.

However, this system has two serious disadvantages. Firstly, the buffer resistors severely limit the power output of the circuit, and secondly, most present day computers are constructed with the Eccles-Jordan type of flip-flop and it would be burdensome for the computer industry to have to shift to the dynamic type of flip-flops to take advantage of redundancy.

In a related area of the computer art, there is disclosed in copending U.S. patent application Serial No. 602,207 for "Voted Output Flip-Flop Units," filed on August 6, 1956, now Patent No. 2,910,584, by Floyd G. Steele, a diode "quad" unit whereby the reliability of the "quad" unit is considerably greater than that of an individual diode. The diode "quad" unit includes four diodes wherein the four diodes are coupled together as a pair of two diode serial units, the two serial units being intercoupled in parallel with each other. In a more remote area Moore and Shannon have investigated the use of redundant "quad" relays as a method of increasing the reliability of relays and a report of their investigation may be found in the September and October 1956 issue of The Journal of the Franklin Institute in an article entitled "Circuits Using Less Reliable Relays" by E. Moore and C. Shannon.

The diode "quad" techniques taught by Steele are, however, limited to use in two terminal components. In order to utilize redundancy in a transistorized flip-flop, a three terminal transistor component must be dealt with and, as hereinafter explained, the problems encountered with a three terminal flip-flop are far more complex than those encountered with a two terminal component.

In a similar manner the idealized relay "quad" techniques taught by Moore and Shannon do not appear to be practically applicable to the problem of constructing a redundant transistor flip-flop. As stated by Moore and Shannon in their report, the report is not intended for practical design purposes, but rather for theoretical and mathematical insight into the problem and deals only with idealized relays. As defined by Moore and Shannon an idealized relay is one whose failures are limited to intermittent failures of a relay to open or close its contacts. Moore and Shannon, in other words, do not take into account the possibility of any permanent failure or of the relay wearing out with age, or of the windings of the relay burning out. Moreover any possibility of any interaction between the relay winding and the relay contacts is ignored. Thus, for example the idealized relay cannot short between the relay windings and the relay contacts nor can any "open" occur between the winding and contacts (nor would such an "open" have any significance in a relay). Since no interaction is possible between the relay contacts and the relay windings the idealized relay treated by Shannon and Moore is treated by them as a two terminal device for the purposes of redundant "quad" design. Since it is clear that a three terminal transistor component can interact between terminals by shorting and opening, as is hereinafter explained in detail, the idealized relay "quad" techniques taught by Moore and Shannon are therefore inapplicable to a three terminal transistor component.

In order to produce a redundant transistorized flip-flop of the Eccles-Jordan type, the redundant transistors must do the work of one transistor in such a way that if any one (or possibly two) of the redundant transistors fails, the operation of the remaining transistors must be unaffected. To mechanize a redundant transistor that could meet these requirements has proved to be a very difficult problem. The reason for this extreme difficulty can be appreciated if it is realized that a three terminal component can short out in more than one manner as well as act as an open circuit in more than one manner. For example, a transistor can short between the emitter and collector electrodes as well as between the base electrode and the emitter or collector electrode; therefore, providing 3 different modes of shorting. In the same manner a transistor can become open circuited in any one of 3 different modes. The difficulty of mechanizing a redundant transistor flip-flop is further complicated by the fact that each electrode of the transistor must be biased at a predetermined voltage and as would be expected it is an extremely difficult problem to intercouple the redundant transistors in a manner such that the failure of one or more of the redundant transistors does not adversely affect the biasing voltages on one or more electrodes of the remaining operable transistors. A still further difficulty encountered in mechanizing a redundant transistor flip-flop is that of actuating all the redundant transistors. As is well known, the input impedance of any particular type of transistor varies from transistor to transistor so that in a redundant transistor flip-flop the transistor with the lowest input impedance tends to draw most of an input triggering signal current, therefore, not allowing the other redundant transistors to draw enough of the input triggering signal current to trigger the transistors.

The present invention provides on the other hand, a redundant transistor "quad" flip-flop of the Eccles-Jordan type having two sets of four transistors connected in a series parallel arrangement so that if any one of the redundant transistors fail the operation of the "quad" flip-flop is unaffected. Each of the two transistors comprising a conventional Eccles-Jordan flip-flop is replaced by a "quad" or quadruple transistor unit in the "quad" or quadruple transistor flip-flop of the invention so that two "quad" units are utilized in each "quad" flip-flop of the invention. In a quad unit any one of the four "quad" transistors can short out or become open circuited in any possible manner without affecting the operation of the transistor "quad" thereby allowing the "quad" unit to continue to function. Further, the present invention provides an individual current storage element for each of the four redundant transistors each of which is discharged into the corresponding transistor by an input triggering signal, so as to supply substantially equal triggering currents to each transistor despite inequalities in transistor input impedance.

In order to compare the reliability of the redundant "quad" flip-flop of the invention to that of the voted output flip-flop unit, attention is now directed to an approximate calculation of the probability of failure of a transistor "quad" unit such as is included in the present redundant flip-flop. In considering the probability of failure of the transistor "quad" unit there must be taken into account the fact that the transistor may develop a short between the emitter electrode and the collector electrode or between the base electrode and either the emitter or collector electrodes. Further, the fact that the transistor may develop an open in any of its three electrodes must also be considered along with the fact that in the present redundant flip-flop, an input balancing circuit is utilized with each transistor "quad" which may also short or open.

The input balancing circuit as will be more fully described hereinbelow comprises four integrating input conductors which are used to store current and balance the input signal among the four transistors of the "quad" unit.

If it is assumed (as appears to be true) that it is highly improbable that a simultaneous occurrence of two or more different types of failure fo a single transistor will take place and if certain other simplifying assumptions are made it can be shown that an approximation of the failure probability of a transistor quad of the type described is given by the following equation:

$$S=\tfrac{1}{3}(4T^2+6TD+3D^2) \qquad (1)$$

where S is the probability of failure of the "quad," T is the probability of failure of the transistor, and D is the probability of failure of the input balancing circuit. A "reasonable" assumed probability of failure T for the transistor is of the magnitude of $10^{-3}$ while a "reasonable" probability of failure D for the input balance circuit is also of the magnitude of $10^{-3}$, so that substituting in Equation 1 there is obtained:

$$S=\tfrac{1}{3}[4(10^{-3})^2+6(10^{-3})(10^{-3})+3(10^{-3})^2]$$
$$=4\times10^{-6}$$

Comparing now the probability of failure of a conventional two transistor flip-flop of the Eccles-Jordan type with a transistor "quad" flip-flop of the same type, it can be shown that the probability of failure of the conventional two transistor flip-flop is given by the following equation:

$$P_f=2T-T^2 \qquad (2)$$

where $P_f$ is the probability of failure of the flip-flop circuit. Substituting into Equation 2 there is obtained:

$$P_f=2(10^{-3})-10^{-6}$$
$$=2\times10^{-3}$$

The $10^{-6}$ term being negligible in relation to $10^{-3}$.

Considering now the probability of failure of the transistor "quad" flip-flop of the invention, the substitution of the probability of failure of transistor "quad" S for the probability of failure of a transistor T in Equation 2 gives the probability of failure of the transistor "quad" flip-flop which is:

$$Q_f = 2S - S^2$$
$$= 2(4\times10^{-6}) - 16\times10^{-12}$$
$$= 8\times10^{-6}$$

where $Q_f$ is the probability of failure of the "quad" flip-flop and the term in $10^{-12}$ is negligible.

Comparing now the probability of failure of the flip-flop of the present invention utilizing two transistor "quad" units with a conventional flip-flop utilizing two transistors, there is obtained an improvement factor $G_1$ whose value is:

$$G_1 = \frac{P_f}{Q_f}$$

$$= \frac{2\times10^{-3}}{8\times10^{-6}} = 250$$

Therefore, a flip-flop designed in accordance with the invention has for the assumed conditions a reliability 250 times that of a conventional prior art flip-flop.

It should be appreciated of course, that while Equation 1 is a good approximation of the probability of failure of a transistor "quad" with associated balancing circuit, it is not an exact representation of the probability of failure, but is only given here as a means for comparing the increase in reliability of a flip-flop employing transistor "quads" over a conventional prior art flip-flop circuit.

In addition to its inherently high reliability, the transistor "quad" flip-flop of the present invention has certain other advantages which are not immediately obvious. One important advantage is that it is very easy to check each "quad" transistor unit while it is in operation to discover if any one of the four transistors therein has failed. This can be accomplished by checking the voltages on the three electrodes of each transistor. In this manner faulty transistors can readily be found and replaced by a routine check while the flip-flop and the machine it is part of are still running and before the defective transistor, even though it may have completely failed, has been able to cause incorrect operation of the machine.

It is clear, therefore, that a machine constructed with the "quad" flip-flop of the invention may be adequately serviced and repaired through infrequent checks by relatively unskilled personnel. Defective flip-flop circuits can be infallibly located without any knowledge at all of the organization of the machine. In contrast, in machines utilizing conventional two transistor flip-flops, a defective transistor causes errors to be propagated throughout the machine and it is only through use of special checking programs and through a thorough understanding of machine operation that a defective component can be located.

It is therefore an object of the invention to provide a "quad" assembly of four transistors connected in a series-parallel arrangement such that the failure in any manner of any one of the four transistors does not affect the operation of the "quad."

It is another object of the present invention to provide a transistor flip-flop circuit whose reliability is substantially greater than the transistor flip-flops of the prior art.

It is yet another object of the invention to provide a redundant transistor "quad" unit wherein the failure of any one of the redundant transistors does not upset the biasing voltages applied to the remaining operable transistors of the "quad."

It is a further object of the present invention to provide a current storage element for each transistor within a transistor "quad" unit for supplying predetermined triggering current to each transistor despite inequalities in the transistor's input impedance.

It is a still further object of the present invention to provide a redundant transistor "quad" flip-flop wherein a defective transistor contained therein will not cause the flip-flop to fail and the defective transistor may be easily located and replaced by relatively unskilled personnel.

The novel features which are believed to be characteristic of the invention, both as to its organization and method of operation, together with further objects and advantages thereof, will be better understood from the following description considered in connection with the accompanying drawings in which two embodiments of the invention are illustrated by way of example. It is to be expressly understood, however, that the drawings are for the purpose of illustration and description only and are not intended as a definition of the limits of the invention.

Figure 1:
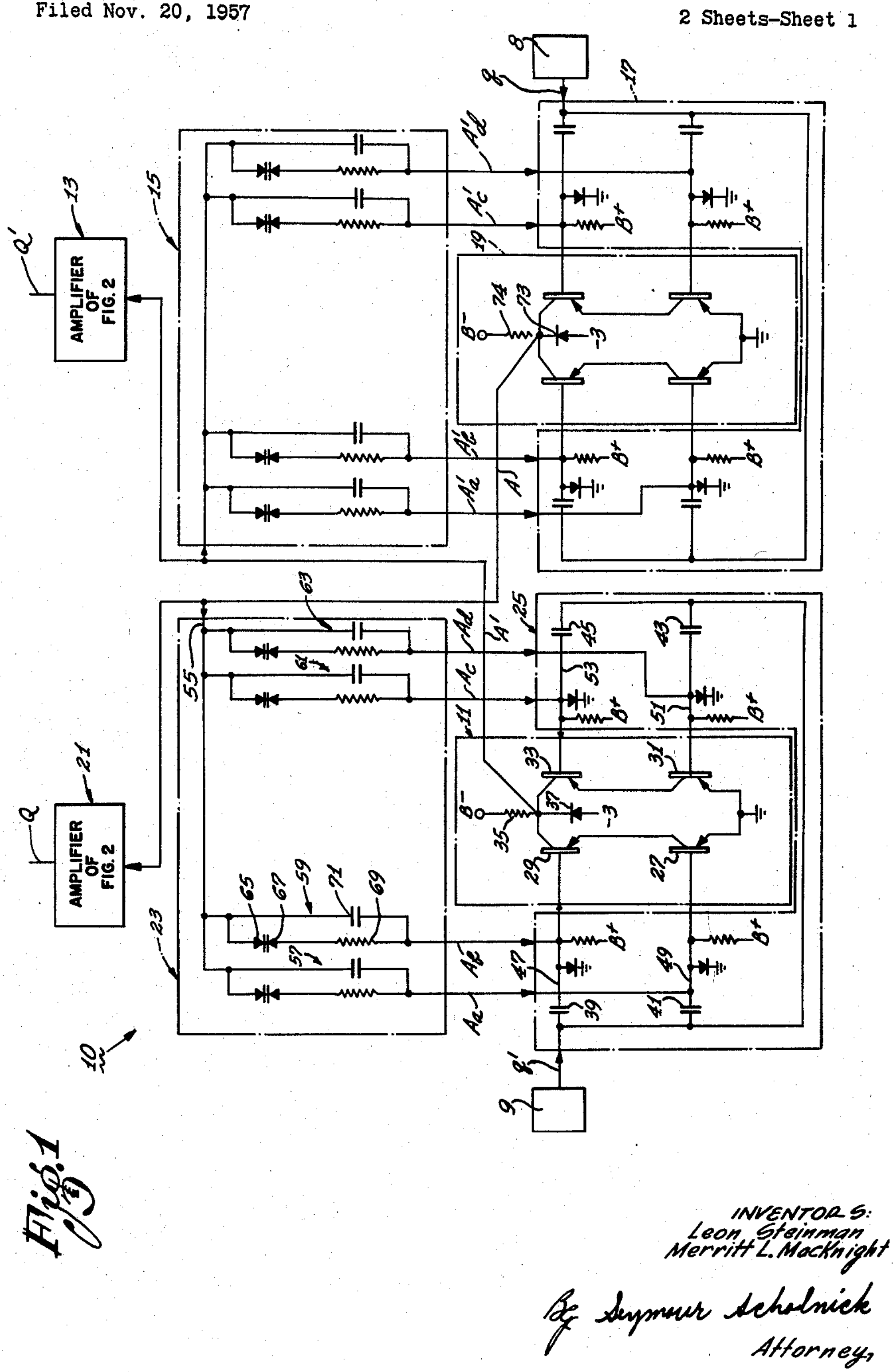
Figure 1 is a partly block and partly circuit diagram of a redundant transistor "quad" flip-flop.

Referring now to the drawings wherein like parts are similarly designated throughout the several views, there is shown in Figure 1 in accordance with the invention a partly block, partly circuit diagram of a highly reliable redundant transistor "quad" flip-flop circuit, generally designated 10, which is operable for changing its stable state from a "0" state to a "1" state or from a "1" state to a "0" state in response to triggering pulses of a pair of input signals $q$ and $q'$, generated by a pair of input signal sources 8 and 9, respectively, applied to correspondingly designated conductors $q$ and $q'$, respectively, and for generating a high and low bivalued flip-flop output signal Q and a complementary signal Q', whose values are representative of the stable state of the flip-flop circuit and are generated upon correspondingly designated conductors Q and Q'. (For purposes of facilitating and clarifying description, each conductor will be hereinafter similarly designated in terms of the signal applied over the conductor.

As shown in Figure 1, within flip-flop 10, a flip-flop component quadruple transistor amplifier unit or "quad" 11 generates a bivalued output signal A' having a high and a low value when the amplifier is biased conductive and non-conductive, respectively. Bivalued output signal A' is applied over conductor A' to an output quadruple transistor amplifier unit 13 which is responsive thereto to generate output signal Q' which is equivalent to an amplified and inverted signal A'. Bivalued signal A' is further applied to a coupler 15. Coupler 15 distributes bivalued output signal A' as a plurality of corresponding bivalued signals $A'_a$, $A'_b$, $A'_c$, and $A'_d$ which are applied to an input current storage circuit 17 of another flip-flop component quadruple transistor amplifier unit or "quad" 19. Amplifier 19 is biased non-conductive or conductive in accordance respectively with the high or low level of signal A' (and hence of signals $A'_a$, $A'_b$, $A'_c$, $A'_d$).

Flip-flop component quadruple transistor amplifier unit or "quad" 19 in turn generates a bivalued signal A having a high and a low value when the amplifier is biased conductive and non-conductive, respectively. Bivalued signal A is applied over conductor A to output quadruple transistor amplifier unit 21 which is responsive thereto to generate output signal Q which is equivalent to signal A after amplification and inversion. Bivalued signal A is further applied to a coupler 23 which distributes bivalued signal A as a plurality of bivalued signals $A_a$, $A_b$, $A_c$, and $A_d$ respectively which are applied to an input current storage circuit 25 of flip-flop component transistor "quad" amplifier 11. Amplifier 11 is biased non-conductive and conductive, respectively in accordance with the high and low levels of signal A (and hence of $A_a$, $A_b$, $A_c$, $A_d$). Thus it is seen that as hereinbefore described, flip-flop component transistor "quad" amplifiers 11 and 19 are intercoupled by conductors A and A′ and couplers 15 and 23 so that only one of the amplifiers at a time can be conductive.

In the overall operation of flip-flop 10 transistor "quad" amplifier 11 is responsive to the application of a triggering pulse of input signal *q′* to input current storage circuit 25 to become consistently conductive (if it is not already in a conductive state) and to drive amplifier 19 nonconductive. Similarly transistor "quad" 19 is responsive to the application of a triggering signal pulse of input signal *q* to input current storage circuit 17 to become consistently conductive (if it is not already in a conductive state) and to drive amplifier 11 non-conductive. Therefore, in overall operation the flip-flop circuit is responsive to each triggering pulse of input signal *q* to generate output bivalued signal Q having the low value and output bivalued signal Q′ having the high value; while the flip-flop circuit is responsive to each trigger pulse of input signal *q′* to generate output bivalued signal Q having the high value and output bivalued signal Q′ having the low value.

Figure 2:
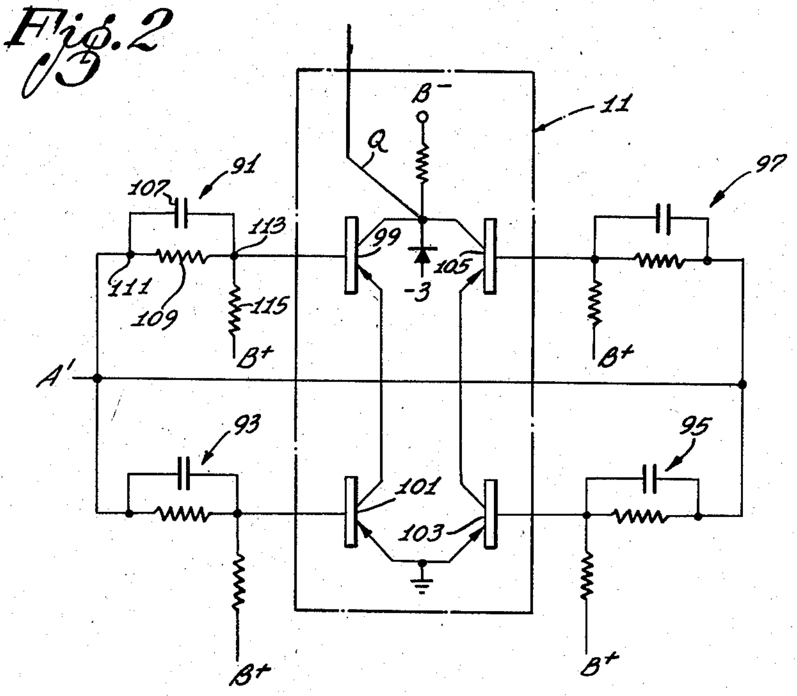
Figure 2 is a circuit diagram of a transistor "quad" amplifier and associated input circuit utilizable in the "quad" flip-flop shown in Figure 1.

Referring now in detail to transistor "quad" amplifier 11, four PNP transistors 27, 29, 31 and 33 are intercoupled in such a manner that the collector electrode of transistor 27 is connected to the emitter electrode of transistor 29 while the collector electrode of transistor 31 is connected to the emitter electrode of transistor 33. As shown in Figure 2, the emitter electrodes of transistors 27 and 31 are connected to a source of ground potential and the collector electrodes of transistors 29 and 33 are connected in common to a source of negative potential B− through a resistor 35 as well as to the cathode electrode of a diode 37 whose anode electrode is connected to a −3 volt source of potential. Further, the collector electrodes of transistors 29 and 33 are connected to output conductor A′. It is apparent from the foregoing that the four transistors of the transistor "quad" are connected in a series-parallel configuration. More particularly, the four transistors are connected in a symmetrical series-parallel circuit comprising two legs each including two serially connected transistors and each by being connected in parallel with one another.

In operation it is clear that the emitter electrodes of the transistors must be at a positive potential in relation to the biasing voltage on the base electrodes of the transistors in order for the transistors to be rendered conductive. Since the emitter electrodes of transistors 27 and 31 are at ground potential the base electrode of transistors 27 and 31 must be biased at a negative potential in order for transistors 27 and 31 to be conductive. Conversely, if the base electrodes of transistors 27 and 31 are biased positive, the transistors will be biased nonconductive. As shown in Figure 1, the emitter electrodes of transistors 29 and 33 are coupled to the collector electrodes of transistors 27 and 31 respectively. Thus when transistors 27 and 31 are non-conductive, the emitter electrodes of transistors 29 and 33 are left floating causing transistors 29 and 33, to be biased non-conductive. On the other hand, when transistors 27 and 31 are biased conductive, the emitter electrodes of transistors 29 and 33 will also be approximately at ground potential (actually slightly positive) so that the base electrodes of transistors 29 and 33 also need to be biased at a negative potential for transistors 29 and 33 to be biased conductive. In overall operation the four transistors are biased conductive when a negative voltage bias is applied to the base electrodes of the transistors while the four transistors are biased non-conductive when a positive voltage bias is applied to the base electrodes of the transistors. In conclusion, it should be noted that output signal A′ is clamped at its low level at −3 volts by diode 37. The high value of output bivalued signal A′ is ordinarily close to ground potential and is fixed by the value of resistor 35, the magnitude of negative potential source B−, and the characteristics of the four transistors. Utilizing a source of negative potential of −22½ volts, a resistor of the value of 1.3K ohms, and four T1159 transistors, manufactured by Lansdale Tube Company, the high value of signal A′ is −.1 volt.

Referring now to input current storage circuit 25, within this circuit input signal *q′* is applied to one side of a plurality of current storage capacitors 39, 41, 43 and 45, the other side of capacitors 39, 41, 43 and 45 being coupled to the base electrodes of transistors 29, 27, 31 and 33, respectively, over conductors 47, 49, 51 and 53, respectively. As shown in Figure 1 each conductor 47, 49, 51 and 53 is connected through a resistor of relatively large magnitude to a source of positive potential B+, each conductor also being connected to the anode electrode of a corresponding diode, the cathode electrodes of these four diodes being connected to a source of ground potential.

Bivalued signals $A_a$, $A_b$, $A_c$ and $A_d$ are applied to input current storage circuit 25 over correspondingly designated conductors which are connected to conductors 49, 47, 53 and 51, respectively. As hereinbefore described, bivalued signals $A_a$, $A_b$, $A_c$ and $A_d$ bias the four transistors 29, 33, 27 and 31 of transistor "quad" amplifier 11 conductive and non-conductive when the bivalued signals have low and high values, respectively. When the bivalued signals have a high value, the signals $A_a$, $A_b$, $A_c$, $A_d$ applied over conductors 47, 49, 43 and 53 are clamped at approximately .3 volt since each conductor is connected to the anode of a diode whose cathode is coupled to ground potential. The signals are not clamped at ground potential but at approximately .3 volt due to the fact the diode has a finite amount of internal resistance. When bivalued signals $A_a$, $A_b$, $A_c$ and $A_d$ have a low value, these signals are maintained at approximately −1.5 volts which is derived from the −3 volts value of bivalued output signal A.

Referring now to the effect and character of input signal *q′* on input current storage circuit 25 and transistor "quad" amplifier 11, it must be noted that current storage capacitors 39, 41, 43 and 45 are charged up to a high potential by signal *q* whenever the signal rises to its high level. Upon occurrence of a negative triggering pulse excursion of signal *q′*, current storage capacitors 39, 41, 43 and 45 are immediately discharged, causing a negative actuating pulse (with a peak at approximately −3.2 volts) to be generated on conductors 47, 49, 51 and 53. If conductors 47, 49, 51 and 53 are negatively biased, thereby resulting in transistor "quad" amplifier 11 being conductive, the generation of the negative actuating pulse has no effect on the operation of amplifier 11; but if these conductors are positively biased with amplifier 11 then being non-conductive, the conductors are driven momentarily negative which results in amplifier 11 becoming consistently conductive and transistor "quad" amplifier 19 becoming non-conductive, as hereinbefore explained. Actuation by negative triggering pulses is the preferred method of actuation, however, the transistor "quad" flip-flop can be actuated by positive triggering pulses, either by using n.p.n transistors or by applying the triggering pulse to the base electrodes of the "quad" that is biased conductive.

It should be specifically noted that each of the current storage capacitors acts as an individual current storage element for its respective transistor, each capacitor storing approximately equal charge as determined by the equilibrium condition attained by the capacitors in response to the high level of signal *q′*. Therefore, a relatively small magnitude input triggering pulse of signal *q′* discharges approximately equal currents into the bases of the four transistors and thus triggers all four transistors despite differences in input impedances among the transistors.

As hereinbefore stated coupler 23 receives output bivalued signal A and distributes it as the plurality of bivalued signals $A_a$, $A_b$, $A_c$, and $A_d$. Bivalued signal A is applied within coupler 23 over an input conductor 55 to a plurality of four modified RC coupling circuits, generally desigiated 57, 59, 61 and 63. RC coupling circuits 57, 59, 61 and 63 transmit bivalued signal A as the bivalued signals $A_a$, $A_b$, $A_c$, and $A_d$, respectively. Considering one of these coupling circuits, by way of example, coupling circuit 59 includes a pair of Zener diodes 65 and 67 coupled back to back and serially connected with a resistor 69. Coupling circuit 59 further includes a speed up capacitor 71 connected in parallel with resistor 69 and capacitor 71.

In operation resistor 69 and capacitor 71 are conventional coupling elements, the resistor functioning to reduce the voltage of bivalued output signal A while capacitor 71 functions as a speed up element by providing a means to by-pass resistor 69 and thus reducing the transient delay in application of signal A, which would otherwise be caused by the interaction of resistor 69, stray capacitance along conductor $A_b$, and capacitor 39. Zener diode 65 has a Zener breakdown voltage of 3 volts and is utilized as an additional voltage reduction element rather than additional resistance since larger net resistance would give a longer transient delay time which would slow up the operation of the flip-flop. Diode 67 also has a Zener breakdown voltage of 3 volts and is utilized to decouple conductor A from conductor $A_b$ whenever a triggering pulse of input signal $q'$ is received so that a small triggering pulse can trigger the flip-flop.

Referring now to input current storage circuit 17 and transistor "quad" amplifier 19, it is seen in Fig. 1 that these two components are identical in structure respectively to input current storage circuit 25 and transistor "quad" amplifier 11, and therefore will not be herein further described except to point out that "quad" amplifier 19 is triggered by application of triggering pulse of signal $q$ to input current storage circuit 17 and generates output bivalued signal A. Further, it should be noted that a diode 73 and a resistor 74 within "quad" amplifier 19 corresponds to diode 37 and a resistor 35 in "quad" amplifier 11, while the same source of B— and —3 volt potential is utilized in both "quads" 11 and 19.

Referring again to Figure 1 it will be shown that the failure of any one of the four transistors within the transistor "quad" 11 will not cause the "quad" itself to fail and moreover will not cause any interference with the successful operation of flip-flop 10. If, for example, either transistor 27 or 31 alone should suffer a base open it is clear that the opened transistor would no longer be able to amplify and current cannot flow therethrough so that the transistor connected in series with the malfunctioning transistor would also be unable to amplify. Therefore, one side of "quad" amplifier 11 would no longer be able to amplify, a side of the "quad" amplifier being one of the two serially connected groups of two transistors of the "quad." However, the other side of "quad" amplifier 11 would be able to function, thereby permitting the flip-flop to operate. If either transistor 27 or 31 alone suffers an emitter or collector electrode open no amplification is possible by the transistor in failure so that again one side of quad amplifier 11 would no longer be able to amplify but the other side would function, permitting the flip-flop to operate.

If either transistor 29 or 33 alone suffers a base electrode open, no amplification is possible from the side of the "quad" containing the defective transistor since the defective transistor has no base current, and, therefore, no current can flow between the emitter and collector electrodes, thereby "floating" (effectively disconnecting) the collector electrode of the transistor serially connected with the defective transistor. If either transistor 29 or 33 alone develops a collector or emitter open it is similarly clear that current will not pass from the emitter to the collector thereby eliminating the amplification of the side of the "quad" containing the defective transistor. Therefore, if either transistor 29 or 33 alone opens in any possible manner, one side of transistor "quad" amplifier 11 will remain operative, permitting the flip-flop to operate despite the transistor failure.

Considering now the affect of a complete short between the electrodes of any one of the transistors comprising "quad" amplifier 11, it is clear that the problem of complete shorting is more difficult than that of an open circuit since a complete short between the electrodes of one transistor could apparently affect the biasing voltages on the remaining transistors to such a degree that they, too, could become inoperative. However, because of the unique design of the invention, only the side of the transistor "quad" containing the defective component will be inoperative, the biasing voltages on the remaining operable transistors of the other side of the quad will be unaffected since little current will flow over the shorted path.

If transistor 27 or 31 develops an emitter to base short the defective transistor will fail to amplify since it is effectively a diode and the collector electrode of the transistor will be left floating since again the collector is back biased. Since the collector electrode is connected to the emitter electrode of the transistor serially connected to the defective transistor the serially connected transistor will be inoperative resulting in no amplification from that side of "quad" amplifier 19 containing the defective transistor. In addition, if transistor 27 is the shorted transistor then when bivalued output signal A has its low value, an additional current will flow to conductor $A_a$ and conductor A from ground via the shorted emitter-base. It would be expected that this current flow would reduce the voltage of output bivalued signal A, and thereby reduce the voltage of bivalued signals $A_b$, $A_c$, and $A_d$, resulting in a deleterious change in biasing voltage on the base electrodes of transistors 29, 31 and 33.

However, the —3 volt potential source B—, resistor 74 and diode 73 combine to provide a low impedance source of current at —3 volts. In normal operation when the flip-flop operates without any of its transistors having a short, signal A at its low level is maintained at —3 volts by clamping diode 73 passing a clamping current. When transistor 27 suffers a base to emitter electrode short the additional current that flows from the source of ground potential to the base electrode of transistor 27 reduces the clamping current but does not affect the —3 volt potential, thereby allowing the flip-flop to maintain the proper biasing voltages despite the short circuit. When bivalued output signal A has the high value the potential on the base electrode of the shorted transistor will be pulled from .3 volt to ground potential. However, this small drop will not affect the biasing voltages of the operable transistors. If transistor 31 should develop a base to emitter electrode short, the additional current drawn over the base electrode would be compensated for in the same manner herein disclosed in connection with transistor 27. If any one of the four transistors in transistor "quad" amplifier 11 develops an emitter to collector short is is clear that the transistor will be inoperative. However, the other three transistors within the "quad" will continue to function. This is true since if either transistor 27 or 31 shorts between collector and emitter the emitter electrode of the transistor serially connected with the defective transistor will be biased at ground potential and therefore operative. If either transistor 29 or 33 develops such a short, the collector electrode of the transistor serially connected with the defective transistor is still connected to the source of B— potential and therefore remains operable.

Examining the effect of a collector to base electrode short, if any one of the four transistors in transistor "quad" amplifier 11 develops a collector to base electrode short, the shorted transistor is inoperative. In addition, if transistor 29 or 33 is the shorted transistor a relatively large amount of current will be drawn from the base electrode of the defective transistor when transistor "quad" amplifier 11 is non-conductive. However, potential source B—, resistor 35, diode 37, and the potential source of —3 volts within "quad" amplifier 11 has the capacity to supply such a current without effecting the biasing potential on the remaining transistors within the "quad." The operation of potential source B—, resistor 35, diode 37, and the potential source of —3 volts is identical to that of potential source B—, resistor 74, diode 73, and the potential source of —3 volts which has been hereinbelow described. If transistor 27 or 31 is the shorted transistor then the current drawn from the base electrode to the potential source B— is limited by the impedance of the serially connected transistor so that the magnitude of the current is not nearly as great as in the case of transistor 29 or 33.

It should be noted that all the interelectrode shorts hereinbefore described are complete shorts which result in little impedance between the two shorted points. In addition to this type of short, transistors are subject to partial shorts, which are defects in the transistor which lower the impedance between the electrode terminals but do not completely short the electrodes. In the case of an internal short the magnitude of the amplification of the shorted transistor is affected to some degree but there is no tendency to upset the biasing voltages on the other transistors; therefore, it is clear that the operation of transistor "quad" 11 would not be affected by a partial short developed within transistors 27, 29, 31 or 33. Further, it should be noted that the discussion of the effect of the failure of any one of the transistors of transistor "quad" 11 on the operation of the "quad" is equally relevant to the failure of any one of the transistors within transistor "quad" amplifier 19.

It has been demonstrated hereinbefore that any one transistor in each of transistor "quad" amplifiers 11 and 19 can fail without affecting the operation of the flip-flop. In addition, however, more than one transistor in each of transistor "quad" amplifiers 11 and 17 can fail without affecting the operation of the flip-flop. For example, both transistor 27 and 31 could suffer an emitter to collector complete short, yet "quad" amplifier 11 would continue to be operable. As has been hereinbefore fully discussed, the problem of a transistor failure interacting with the other transistors within the "quad" through the bias supplies has been eliminated so that comparing the reliability of the flip-flop of the present invention with a conventional flip-flop utilizing two transistors, there is obtained an improvement in reliability of 250 times that of the conventional flip-flop.

Referring now to Fig. 2, there is shown a circuit diagram of a D.C. transistor "quad" amplifier which is suitable for use as either output quadruple amplifier unit 13 or 21. However, hereinafter the circuit diagram of Fig. 2 will be considered a diagram of D.C. amplifier 13. As shown in Fig. 2, amplifier 13 includes a series of input circuits and a "quad" amplifier 11. Amplifier 13 is responsive to output bivalued signal A' to generate flip-flop output signal Q. "Quad" amplifier 11 has been hereinbefore discussed in connection with Fig. 1; therefore, only the input circuits thereto will be herein described.

As shown in Fig. 2, bivalued signal A' is applied over conductor A' to a series of coupling circuits, generally designated 91, 93, 95 and 97 respectively. The output signals of coupling circuits 91, 93, 95 and 97 are applied to a plurality of four transistors 99, 101, 103, 105, respectively. As shown in Fig. 2, all four coupling circuits are identical in structure and function; therefore, only coupling circuit 91 will be herein further described. Coupling circuit 91 includes a speedup capacitor 107 and a buffer resistor 109 connected in parallel configuration at a terminal 111 and a terminal 113. These two components function as a conventional RC coupling element. Terminal 113 is biased at a slightly positive voltage by a source of positive potential B+ coupled to terminal 113 through resistor 115.

In operation, upon application of bivalued signal A' having the high value of .1 volt the base electrodes of the transistors will be positive biased thereby making the transistors non-conductive resulting in generation of signal Q having the low value. Upon application of bivalued signal A' having the low value of —3 volts, the base electrodes of the transistors will be biased negative such that the transistors will be conductive, thereby generating signal Q having the high value.

Figure 3:
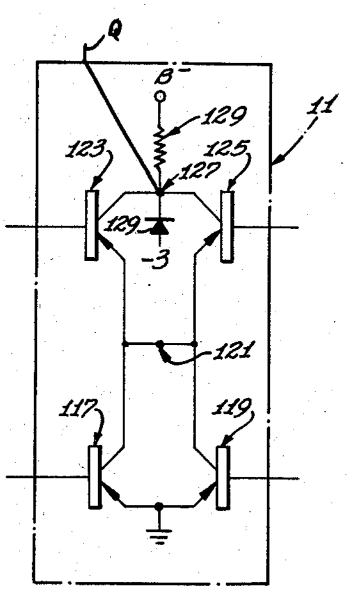
Figure 3 is a circuit diagram of another transistor "quad" amplifier utilizable in the "quad" flip-flop shown in Figure 1.

Referring now to Fig. 3, there is shown another embodiment of a "quad" unit 11 having the four transistors therein connected in a symmetrical series-parallel circuit comprising two legs each including two transistors which is more resistant to failures as a result of emitter or collector electrode open circuits. As shown in Fig. 3, the emitter electrodes of a pair of transistors 117 and 119 are connected to a source of ground potential while the collector electrodes of the two transistors are connected to a common terminal 121. The collector electrodes of another pair of transistors 123 and 125 are coupled to a common terminal 127. A source of potential B— is coupled through a resistor 129 to common terminal 127 while a —3 volt potential source is coupled to common terminal 127 by means of a clamping diode 129. The emitter electrodes of transistors 123 and 125 are coupled to common terminal 121.

The "quad" unit of Fig. 3 operates in the same manner as the "quad" unit of Fig. 2, however, "quad" unit 11, as shown in Fig. 3, can have an emitter or collector electrode open circuit in transistors 119 and 123 or transistors 117 and 125 and still remain operable; therefore, this embodiment of the invention is desirable where a type of transistor is utilized which has a high degree of probability of developing an emitter or collector open circuit.

It is to be expressly understood, of course, that numerous other modifications and alterations may be made in the redundant transistor "quad" flip-flops of the invention without departing from the basic concept of the invention. For example, in many applications the flip-flop can be mechanized without amplifiers 13 and 21 by utilizing the output bivalued signals A and A' directly without further amplification. As another example, the diode elements of the flip-flop can be replaced by a diode "quad" which comprise four diodes interconnected in a series parallel configuration. The utilization of a diode "quad" in place of each signal diode further increases the reliability of the flip-flop by decreasing the probability of failure of the flip-flop as a result of the failure of diode elements within the flip-flop. As a still further example, it will be noted that since the emitter and collector electrodes of a transistor are somewhat symmetrical the transistor "quad" amplifier 11 in Fig. 1 can be mechanized with transistors 27, 31, 29, and 33 having their emitter, collector connections reversed. Accordingly, the scope of the invention is to be limited only by the spirit and scope of the appended claims.

What is claimed as new is:

1. In a flip-flop including redundant transistors and having first and second states of operation, the flip-flop being responsive to a triggering pulse of an input signal having a predetermined level for changing its states of operation, the combination comprising: a load resistor having a first and a second terminal; a first source of potential coupled to said first terminal of said load resistor; a second source of potential; a flip-flop component quadruple transistor amplifier unit having four transistors interconnected in a symmetrical series-parallel circuit comprising two legs each leg including two serially connected transistors and said two legs being interconnected in parallel with each other, said flip-flop component quadruple transistor amplifier unit intercoupling said second source of potential and said second terminal of said load resistor and being operable for forming a conductive path and a non-conductive path between said second potential source and said second terminal of said load resistor when the flip-flop operates in the first and second states of operation, respectively; and input balancing means for applying the input signal to each of said transistors.

2. The combination defined in claim 1 wherein said flip-flop component quadruple transistor amplifier unit includes first, second, third and fourth transistors, each having an emitter electrode, a collector electrode and a base electrode and further includes coupling means for intercoupling the collector electrode of said first transistor with the emitter electrode of said second transistor and the collector electrode of said third transistor with the emitter electrode of said fourth transistor, said coupling means further intercoupling the emitter electrodes of said first and third transistors with said second source of potential and intercoupling the collector electrodes of said second and fourth transistors with said second terminal of said load resistor, and said input balancing means includes apparatus for applying the input signal to the base electrodes of said transistors.

3. The combination defined in claim 2 wherein said input balancing means includes a first, a second, a third, and a fourth capacitor, each capacitor having first and second electrodes, said first electrodes of said first, second, third, and fourth capacitors being coupled to the base electrodes of said first, second, third and fourth transistors, respectively, said input balancing means including apparatus for applying the input signal to the second electrode of each of said capacitors to equally charge said capacitors, and responsive to the triggering pulse of the input signal for simultaneously discharging said capacitors whereby substantially equal magnitude pulses are generated at said first electrodes and applied to the base electrodes of said transistors.

4. The combination defined in claim 3 which further includes clamping means for clamping the voltage at said second terminal of said load resistor at a predetermined level whenever the voltage tends to exceed the predetermined level.

5. The combination defined in claim 1 wherein said flip-flop component quadruple transistor amplifier unit includes first, second, third, and fourth transistors each having a first electrode, a second electrode, and a base electrode; coupling means for intercoupling the second electrodes of said first transistor and said third transistor with the first electrodes of said second and fourth transistors, respectively, and for coupling the first electrodes of said first and third transistors to said second source of potential, said coupling means further coupling said second electrodes of said second and fourth transistors with said second terminal of said load resistor.

6. The combination defined in claim 5 wherein said flip-flop component quadruple transistor amplifier unit further includes a conductor having a first terminal connected to the second electrode of said first transistor and a second terminal connected to the second electrode of said third transistor.

7. In a transistor flip-flop circuit employing redundant elements and responsive to a triggering signal, the combination comprising: first, second, third, and fourth transistors, each of said transistors having a base electrode, an emitter electrode, and a collector electrode; a first source of potential; first coupling means for coupling the emitter electrodes of said first and second transistors to said first source of potential; second coupling means for coupling the collector electrodes of said first and second transistors to the emitter electrodes of said third and fourth transistors, respectively; a junction terminal connected to the collector electrodes of said third and fourth transistors; a second source of potential; a load resistor connected in series between said junction terminal and said second source of potential; and input means responsive to the triggering signal for applying the triggering signal at substantially equal magnitudes to the base electrodes of said transistors.

8. The combination defined in claim 7 wherein said input means includes first, second, third, and fourth capacitors, each of said capacitors having first and second electrodes, the first electrodes of said first, second, third and fourth capacitors being coupled to the base electrodes of said first, second, third, and fourth transistors, respectively, said input means including apparatus for applying the triggering signal to the second electrodes of said capacitors.

9. A quadruple transistor amplifier unit for producing an output signal in response to an input signal, said amplifier comprising: a variable conductance quadruple transistor unit including a plurality of four transistors, said four transistors being connected into two serial legs, each leg containing two serially connected transistors and said two legs being connected in parallel with each other, said quadruple transistor unit being operable for permitting any one of said four transistors to fail without destroying the net conductivity of said quadruple transistor unit, said quadruple transistor unit being responsive to the input signal for varying its conductivity in accordance with the magnitude of the input signal; a junction terminal coupled to said quadruple transistor unit; a source of potential; and a load resistor intercoupling said source of potential and said junction terminal whereby the output signal is produced at said junction terminal having a magnitude dependent upon the magnitude of the input signal.

10. The combination defined in claim 9 which includes clamping means coupled to said junction terminal for clamping the output signal whenever the output signal exceeds a predetermined level.

11. A quadruple transistor flip-flop of the Eccles-Jordan type for generating a bivalued signal A having first and second values and a complementary bivalued signal A′, the flip-flop being responsive to a pair of first and second triggering signals for producing bivalued signal A at its first and second values, respectively, said flip-flop comprising: a first flip-flop component quadruple transistor amplifier unit responsive to the first triggering signal for generating the bivalued signal A at the first value and operable in response to application of the bivalued signal A′ at the first value for generating the bivalued signal A at the second value, said first flip-flop component quadruple transistor amplifier unit including a first plurality of transistors connected in a series parallel circuit comprising two legs each including at least two serially connected transistors and said two legs being connected in parallel with each other and apparatus for applying the first triggering signal to each transistor of said first plurality of transistors; a second flip-flop component quadruple transistor amplifier unit responsive to the second triggering signal for generating the bivalued signal A′ at the first value and responsive to bivalued signal A at the first value to generate the bivalued signal A′ at the second value, said second flip-flop component quadruple transistor amplifier unit including a second plurality of transistors connected in series parallel configuration and apparatus for applying the second triggering signal to each transistor of said second plurality of transistors; a first coupler intercoupling said first and second flip-flop component quadruple transistor amplifier units for applying the signal A to said second flip-flop component quadruple transistor amplifier unit; and a second coupler intercoupling said first and second flip-flop component quadruple transistor amplifier units for applying the signal A′ to said first flip-flop component quadruple transistor amplifier unit.

12. The combination defined in claim 11 wherein said first flip-flop component quadruple transistor amplifier unit includes first connecting means for connecting at least a pair of said first plurality of transistors in series and for connecting an additional transistor of said first plurality of transistors in parallel with at least one transistor of said pair, and wherein said second flip-flop component quadruple transistor amplifier unit includes second connecting means for connecting at least a pair of said second plurality of transistors in series and for connecting an additional transistor of said second plurality of transistors in parallel with at least one transistor of said pair of transistors of said second plurality.

13. The combination defined in claim 11 wherein said first and second flip-flop component quadruple transistor amplifier units each further include a first source of potential; a junction terminal; a second source of potential; a flip-flop component transistor quadruple having first, second, third, and fourth transistors, each of said transistors having first, second, and base electrodes; coupling means for intercoupling the second electrodes of said first and third transistors with the first electrodes of said second and fourth transistors and for coupling the first electrodes of said first and third transistors to said second source of potential and the second electrodes of said second and fourth transistors to said junction terminal; a load resistor connected in series between said junction terminal and said first source of potential, the corresponding bivalued signal being produced at said junction terminal; and input means responsive to the triggering signal for applying the triggering signal at substantially equal magnitudes to the base electrodes of said transistors.

14. The combination defined in claim 13 wherein said first coupler has an input terminal connected to the junction terminal of said first flip-flop component quadruple transistor amplifier unit and four coupling networks connected respectively to the base electrodes of corresponding transistors of said four transistors of said second flip-flop component quadruple transistor amplifier unit, each of said coupling networks including a buffer resistor interconnecting said input terminal and the base electrode of the corresponding transistor for applying signal A to the base electrode of the corresponding transistor from the base electrodes of the remaining transistors of said four transistors.

15. The combination defined in claim 14 wherein each of said coupling networks further includes a diode connected in series with said buffer resistor for further isolating the base electrode of the corresponding transistor from the base electrodes of the remaining transistors of said four transistors and a capacitor connected in parallel with said diode and said resistor for further applying said bivalued signal A to the base electrode of the corresponding transistor.

16. The combination defined in claim 15 which further includes a clamping diode and a source of potential coupled thereto, said clamping diode being coupled to said junction terminal of said flip-flop component transistor quadruple for clamping the bivalued signal A at a predetermined level whenever the voltage of bivalued signal A tends to exceed said predetermined level whereby predetermined biasing voltages are maintained on the base electrodes of said transistors of said second flip-flop component quadruple transistor amplifier unit despite the failure of any one of said transistors.

References Cited in the file of this patent

UNITED STATES PATENTS

| | | |
|---|---|---|
| 1,959,513 | Weyandt | May 22, 1934 |
| 2,698,383 | Moody | Dec. 28, 1954 |
| 2,787,712 | Priebe et al. | Apr. 2, 1957 |